(12) United States Patent
Cavalin et al.

(10) Patent No.: US 9,830,533 B2
(45) Date of Patent: Nov. 28, 2017

(54) ANALYZING AND EXPLORING IMAGES POSTED ON SOCIAL MEDIA

(71) Applicant: International Business Machines Corporation, Armonk, NY (US)

(72) Inventors: Paulo Rodrigo Cavalin, Rio de Janeiro (BR); Maira Athanazio de Cerqueira Gatti, Jacarepaguá (BR); Carlos Mendes, Glória (BR); Luis Gregorio Moyano, Rio de Janeiro (BR); Claudio Santos Pinhanez, Jardim Paulista (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/984,542

(22) Filed: Dec. 30, 2015

(65) Prior Publication Data
US 2017/0193333 A1    Jul. 6, 2017

(51) Int. Cl.
*G06K 9/00* (2006.01)
*G06K 9/62* (2006.01)
*G06K 9/48* (2006.01)

(52) U.S. Cl.
CPC .......... *G06K 9/6223* (2013.01); *G06K 9/481* (2013.01); *G06K 9/627* (2013.01); *G06K 9/6215* (2013.01); *G06K 2209/27* (2013.01)

(58) Field of Classification Search
CPC combination set(s) only.
See application file for complete search history.

(56) References Cited

U.S. PATENT DOCUMENTS

| | | | |
|---|---|---|---|
| 6,522,780 B1 * | 2/2003 | Pass | G06F 17/30256 382/170 |
| 2008/0222295 A1 * | 9/2008 | Robinson | G06F 17/30867 709/227 |
| 2011/0040760 A1 * | 2/2011 | Fleischman | G06Q 30/02 707/737 |
| 2012/0005209 A1 * | 1/2012 | Rinearson | G06F 17/30908 707/737 |
| 2012/0102021 A1 | 4/2012 | Hill et al. | |
| 2012/0137367 A1 | 5/2012 | Dupont et al. | |

(Continued)

FOREIGN PATENT DOCUMENTS

| | | |
|---|---|---|
| WO | 2010078925 A1 | 7/2010 |
| WO | 2014059652 A1 | 4/2014 |

OTHER PUBLICATIONS

Ahsan et al. "Clustering Social Event Images using Kernel Canonical Correlation Analysis." CVPR, 2014. (6 pgs).

(Continued)

*Primary Examiner* — Alex Liew
(74) *Attorney, Agent, or Firm* — Cantor Colburn LLP; Louis Percello (57) ABSTRACT

Embodiments focus on the real-time processing and analysis of event-related images posts on social media. By computing the most posted images and grouping them in accordance to their similarity, these images can be organized in a visual interface to provide the users an image-driven social media topic detection system. The groups of images with the highest frequency represent the most prominent topics. By keeping track of the temporal occurrence of the images, it is possible to visualize the temporal evolution of the topics.

20 Claims, 8 Drawing Sheets

(56) References Cited

U.S. PATENT DOCUMENTS

| | | | |
|---|---|---|---|
| 2012/0290551 A9 | 11/2012 | Ghosh | |
| 2013/0046761 A1* | 2/2013 | Soderberg | G06F 17/30038 707/736 |
| 2013/0173531 A1* | 7/2013 | Rinearson | G06F 17/30011 707/608 |
| 2013/0212477 A1* | 8/2013 | Averbuch | H04N 21/4725 715/719 |
| 2014/0019867 A1* | 1/2014 | Lehtiniemi | G06Q 50/01 715/738 |
| 2014/0085328 A1 | 3/2014 | Codella et al. | |
| 2014/0288917 A1* | 9/2014 | Orsini | G06F 17/2854 704/2 |

OTHER PUBLICATIONS

Cataldi et al., "Emerging Topic Detection on Twitter based on Temporal and Social Terms Evaluation." MDMKDD'10, 2010. (10 pgs).

Li et al., "Visual Recognition by Exploiting Latent Social Links in Image Collections." Springer International Publishing 2014. (12 pgs).

Tamura et al.,"Clustering-based Burst-detection Algorithm for Web-image Document Stream on Social Media." SMC, pp. 703-708, 2012.

Cavalin et al., "A scalable architecture for real-time analysis of microblogging data," IBM J. Res. & Dev., vol. 59, No. 2/3, Paper 16, Mar. 2015, pp. 16:1-16:10.

Chen et al., "User-defined hot topic detection in microblogging." In Proceedings of the Fifth International Conference on Internet Multimedia Computing and Service (ICIMCS '13). ACM, New York, NY, USA, 2013, pp. 183-186.

Jia et al., "Caffe: Convolutional Architecture for Fast Feature Embedding," arXiv:1408.5093, 2014, 4 pages.

Petkos et al., "Two-level message clustering for topic detection in Twitter." Snow 2014 Data Challenge, 2014, 8 pages.

Russakovsky et al., "ImageNet Large Scale Visual Recognition Challenge," arXiv:1409.0575, 2014, 43 pages.

* cited by examiner

ANALYZING AND EXPLORING IMAGES POSTED ON SOCIAL MEDIA

BACKGROUND

The present disclosure relates in general to the field of image data analytics. More specifically, the present disclosure relates to systems and methodologies for using social media image content to identify and visualize social media topics over time.

The high volume and high variability of content posted on social media web sites make it challenging to create a visualization framework that can accurately and meaningfully capture social media topics related both to the facts of real-world events, and to the stories about the real-world events that develop through social media activity. Known approaches to creating such a visualization framework include performing sentiment analysis or determining the most frequently posted terms and phrases. Either approach has shortcomings. For example, the simple computation of frequently posted terms/phrases can easily and inadvertently mix together terms from different topics. Semantic analysis can provide holistic, high level views of the sentiment for a set of posts but lack depth and granularity. To the extent these known approaches attempt to consider images, the focus is on clustering similar images and not one connecting the images to the temporal occurrence of topics.

SUMMARY

Embodiments are directed to a computer implemented method of analyzing image data. The method includes receiving, using a processor system, image data of one or more images that have been posted to internet websites. The method further includes analyzing, using the processor system, the image data to extract image features data for each one of the one or more images, and analyzing, using the processor system, the image data to extract metadata of the one or more images. The method further includes creating multiple image files, wherein each one of the multiple image files comprises individual ones of the one or more images linked together based on overlaps between the image feature data of the individual ones of the one or more images, and wherein each one of the multiple image files further comprises individual ones of the one or more images linked together based on overlaps between the metadata of the individual ones of the one or more images. The method further includes indexing the multiple image files to form multiple indexed image files, wherein the indexing is based on the image feature data of the individual ones of the one or more images in an individual indexed image file, and wherein the indexing is further based on the metadata of the individual ones of the one or more images in the individual indexed image file. The method further includes storing the multiple indexed image files in a memory of the processor system having a searchable indexed data storage structure.

Embodiments are further directed to a computer system for analyzing image data. The system includes a memory, and a processor system communicatively coupled to the memory. The processor system is configured to perform a method that includes receiving image data of one or more images that have been posted to internet websites. The method further includes analyzing the image data to extract image features data for each one of the one or more images, and analyzing the image data to extract metadata of the one or more images. The method further includes creating multiple image files, wherein each one of the multiple image files comprises individual ones of the one or more images linked together based on overlaps between the image feature data of the individual ones of the one or more images, and wherein each one of the multiple image files further comprises individual ones of the one or more images linked together based on overlaps between the metadata of the individual ones of the one or more images. The method further includes indexing the multiple image files to form multiple indexed image files, wherein the indexing is based on the image feature data of the individual ones of the one or more images in an individual indexed image file, and wherein the indexing is further based on the metadata of the individual ones of the one or more images in the individual indexed image file. The method further includes storing the multiple indexed image files in the memory, wherein the memory includes a searchable indexed data storage structure.

Embodiments are further directed to a computer program product for analyzing image data. The computer program product includes a computer readable storage medium having program instructions embodied therewith, wherein the computer readable storage medium is not a transitory signal per se. The program instructions are readable by a processor system to cause the processor system to perform a method that includes receiving, using the processor system, image data of one or more images that have been posted to internet websites. The method further includes analyzing, using the processor system, the image data to extract image features data for each one of the one or more images, and analyzing, using the processor system, the image data to extract metadata of the one or more images. The method further includes creating multiple image files, wherein each one of the multiple image files comprises individual ones of the one or more images linked together based on overlaps between the image feature data of the individual ones of the one or more images, and wherein each one of the multiple image files further comprises individual ones of the one or more images linked together based on overlaps between the metadata of the individual ones of the one or more images. The method further includes indexing the multiple image files to form multiple indexed image files, wherein the indexing is based on the image feature data of the individual ones of the one or more images in an individual indexed image file, and wherein the indexing is further based on the metadata of the individual ones of the one or more images in the individual indexed image file. The method further includes storing the multiple indexed image files in a memory of the processor system having a searchable indexed data storage structure.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

In the accompanying figures and following detailed description of the disclosed embodiments, the various elements illustrated in the figures are provided with three digit reference numbers. The leftmost digits of each reference number corresponds to the figure in which its element is first illustrated.

DETAILED DESCRIPTION

Various embodiments of the present disclosure will now be described with reference to the related drawings. Alternate embodiments may be devised without departing from the scope of this disclosure. Various connections are set forth between elements in the following description and in the drawings. These connections, unless specified otherwise, may be direct or indirect, and the present disclosure is not intended to be limiting in this respect. Accordingly, a coupling of entities may refer to either a direct or an indirect connection.

Additionally, although this disclosure includes a detailed description of a computing device configuration including a machine learning module and image vector descriptors, implementation of the teachings recited herein are not limited to a particular type or configuration of computing device(s). Rather, embodiments of the present disclosure are capable of being implemented in conjunction with any other type or configuration of computing devices and/or computing environments, now known or later developed.

Turning now to an overview of the present disclosure, one or more embodiments provide systems and methodologies to detect social media topics over time using posted images. An exemplary methodology operates by keeping track of images with similar semantic content over selected periods of time that overlap a given event that happens in the real world. In other words, during the relevant times periods just before, during and just after a given real-world event, users post on social media web sites a series of images. In many cases, these images possess the same semantic content. At each discrete time interval, the present disclosure determines a similarity between the images and groups those images that are considered as having similar semantic content. The same association is iterated over different periods of time, keeping track of the time interval associated with each image (and its similar variations) over time. According to the present disclosure, each of these groups, which can be referred to as visual groups, presents a different topic, which can be sorted by their frequency for instance. The visual groups can be associated with other information or metadata coming from social media web sites. For example, by combining the visual groups with information from the textual content of posts associated to these images (e.g., sentiment analysis), the most frequently posted terms or expressed sentiments can be associated with the visual group to provide deeper and broader insights about the associated real-world event.

Figure 1:
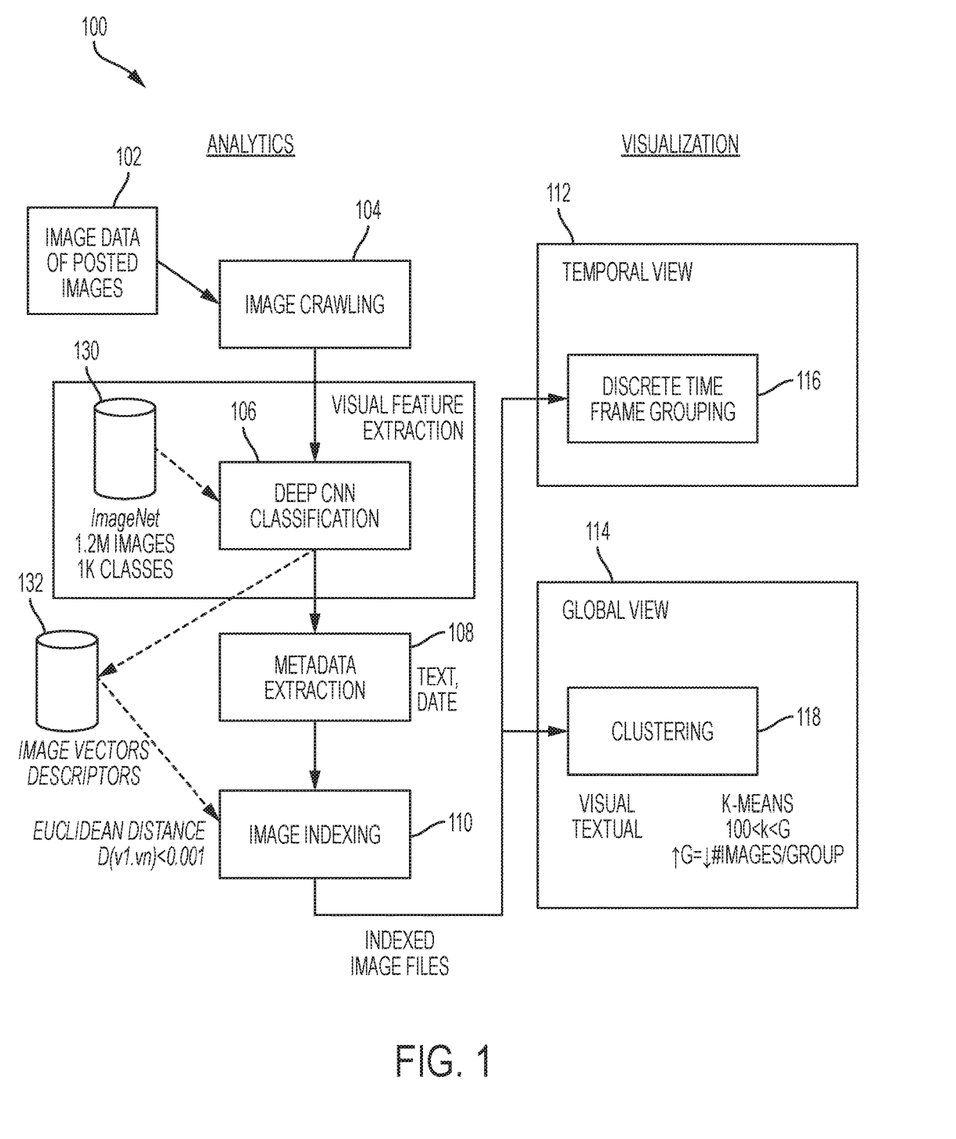
FIG. 1 depicts an image data analysis system according to one or more embodiments.

Turning now to a more detailed description of the present disclosure, FIG. 1 depicts an exemplary image data analysis system 100 and methodology capable of implementing one or more embodiments. Image data analysis system 100 includes an image crawler 104, a machine learning processor (shown as a convolutional neural network (CNN)) 106, a metadata extraction module 108, an image indexing module 110, a temporal view module 112, a global (or clustering) view module 114 and display options 116, 118, configured and arranged as shown.

Image crawler 104 may be implemented using any system that is capable of receiving and/or gathering image and/or associated textual content data from internet web sites. For example, image crawler 104 may include a web crawler (not shown) that includes functionality to allow it to mine and gather communications (e.g., customer reviews at web sites, instant messages, tweets, multimedia chats, Facebook content, etc.) from internet web sites. A web crawler is a program that visits web sites and reads their pages and other information in order to create entries for a search engine index. The major search engines on the web all have such a program, which is also known as a "spider" or a "bot." Web crawlers are typically programmed to visit sites that have been submitted by their owners as new or updated. Entire sites or specific pages can be selectively visited and indexed. Web crawlers crawl through a site a page at a time, following the links to other pages on the site until all pages have been read.

In one or more embodiments, machine learning module 106 includes a CNN, also known as an artificial neural network (ANN), having the capability to be trained to perform a particular function. Machine learning broadly describes a primary function of electronic systems that learn from data. In machine learning and cognitive science, ANNs are a family of statistical learning models inspired by the biological neural networks of animals, and in particular the brain. ANNs may be used to estimate or approximate systems and functions that depend on a large number of inputs and are generally unknown.

ANNs are often embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons which may be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was read.

Alternatively, machine learning module 106 may include a natural language processor (NLP) (not shown) having the capability of being trained to perform a particular function involving the understanding, analysis and/or generation of natural language. For example, typical NLP systems can answer natural language questions by querying data repositories and applying elements of language processing, information retrieval and machine learning to arrive at a conclusion. An example NLP system is IBM'S DeepQA technology as described in U.S. Pat. No. 8,275,803, issued Sep. 25, 2012, which is assigned to the assignee of the present disclosure, and which is incorporated by reference herein in its entirety.

Metadata extraction module 108 may be implemented using a variety of textual content mining and processing tools. The metadata extracted by metadata extraction module 108 may be simple (e.g., textual content, dates, time, etc.) or may be more complex (e.g., GPS derived location information). Metadata extraction module 108 may include textual content preprocessing functionality and textual content feature extraction functionality that generate extracted metadata, which can include textual features such as sentiment, topics, top words, non-standard words (NSW) (e.g., "u" instead of "you" and non-word symbols such as #, !, etc.) and writing style.

In operation, system 100 is divided into two phases, namely analytics and visualization. In the analytics phase, image data of posted images 102 is input to image crawler 104, wherein each post is associated to the URL of an image. Image crawler 104 crawls internet web sites for images and builds an initial set of image files that each include image data of an image. Image data includes but is not limited to data of the actual image, as well as associated metadata such as posting time, textual content, etc. The initial set of image files generated by image crawler 104 is stored in a database (not shown) and provided as an input to machine learning processor 106.

Optionally, image data of posted images may be provided to machine learning processor 106 by an image source 130, an example of which is a web-based service offered under the trade name ImageNet. ImageNet is an image dataset organized according to the WordNet hierarchy. Each meaningful concept in WordNet, which may be described by multiple words or word phrases, is called a "synonym set" or "synset." There are more than 100,000 synsets in WordNet, and a majority of the synsets are nouns (e.g., over 80,000). ImageNet can provide on average 1000 images to illustrate each synset. ImageNet provides thumbnails and URLs of images in a way that is similar to internet search engines. In other words, ImageNet compiles and outputs an accurate list of internet web site images for each synset of WordNet.

Machine learning processor 106 receives the initial set of image files generated by image crawler 104 and/or image source 130. Machine learning processor 106 performs visual feature extraction on each initial set of image file, which can include a consideration of feature sets such as percentiles of histograms, local binary patterns, scale invariant feature transformation, representation learning and the like. The output of machine learning processor 106 is a series of image vector descriptors (or image feature vectors) 132, which can be thought of as vectors that represent a probability that the features of an image belong to a particular set of semantic classes. The semantic classes can be any category under which the image may be classified. For example, an image of a soccer match may be placed in the semantic class "sports." Assuming that the initial set of image files is large (e.g., over 10,000 images), machine learning processor 106 reduces the large number of image files to an image feature vector set having significantly fewer semantic classes (e.g., 200) than the size of the initial set of image files. Image vector descriptors 132 are stored in the database (not shown) and also provided as inputs to metadata extraction module 108. For each image vector descriptor 132, metadata extraction module 108 extracts metadata. The metadata includes but is not limited to complementary information such as posting date, posting time(s), associated textual content, username, etc.

The metadata output from metadata extraction module 108 and image vector descriptors 132 are provided to image indexing module 110. Image indexing module 110 performs indexing/aggregation on each one of the initial sets of image files by linking individual ones of the one or more images together based on overlaps between the semantic classes (i.e., image feature data) of the individual ones of the one or more images. Image indexing module 110 further performs indexing/aggregation on each one of the initial sets of image files by linking individual ones of the one or more images together based on overlaps between the metadata of the individual ones of the one or more images. Accordingly, image indexing module 110 identifies situations in which the metadata and image vector descriptors 132 of image files are sufficiently similar that the images in the image files probably correspond to the same underlying visual content and/or the same underlying semantic content. In one or more embodiments, the level of similarity can be defined as follows. For each pair of image vector descriptors 132, image indexing module 110 computes the distance D using for example the Euclidean distance. If D is below a given threshold T, the two corresponding images of the two image vector descriptors are treated as having the same underlying image content. The results of image indexing module 110 are indexed image files that can be stored in a database or other memory having a searchable indexed data storage structure.

The visualization phase is implemented by temporal view module 112 and global (or clustered) view module 114. Temporal view module 112 groups the images into time intervals, for which the occurrence and frequency of each image at each discrete interval is computed, along with a representation or summary of the textual content associated with the image in the interval. The textual content can be represented by the most frequently posted textual content, the most frequently posted terms, etc. Temporal view module 112 generates an output 116 including for example a list of discrete time intervals, an association of each discrete time interval to a set of the M most posted images, the posting frequency of each image, the most frequently posted textual content for each image at the interval, etc.

Global view module 114 groups the images into clusters using a clustering algorithm. In one or more embodiments, the clustering algorithm proceeds as follows. Assuming that the size of unique images is IUI, cluster the image semantic (e.g., metadata) vector using a clustering algorithm such as K-means, with K set to extend from to a minimum number (e.g., 100) to the value IUI. The results of global view module 114 can be organized and displayed in display option 118 in which a user can select the value of K and visualize the results.

Thus, the visualization phase consists of reading the output generated from the analytics phase and organizing the images in a visual format in a way that the occurrence and the frequency of the most posted images also represent the most posted topics. An example implementation according to the present disclosure is as follows. Images posted within a time interval are represent by stacks of images, wherein the size of the stacks is defined in accordance with the image's relative posting frequency, i.e., the total number of images posted in the corresponding time interval. In this case, a time window having a high numbers of posts will be represented by a higher stack of images, and vice-versa. Analogously, the size of the images inside the stacks is also proportional to the total number of posts, i.e., the most frequently posted images will be larger than the others. In order to improve the visualization phase, a smoothing function can be applied to some parameters to allow the user to adjust the visualization in time frame grouping 116.

Figure 2:
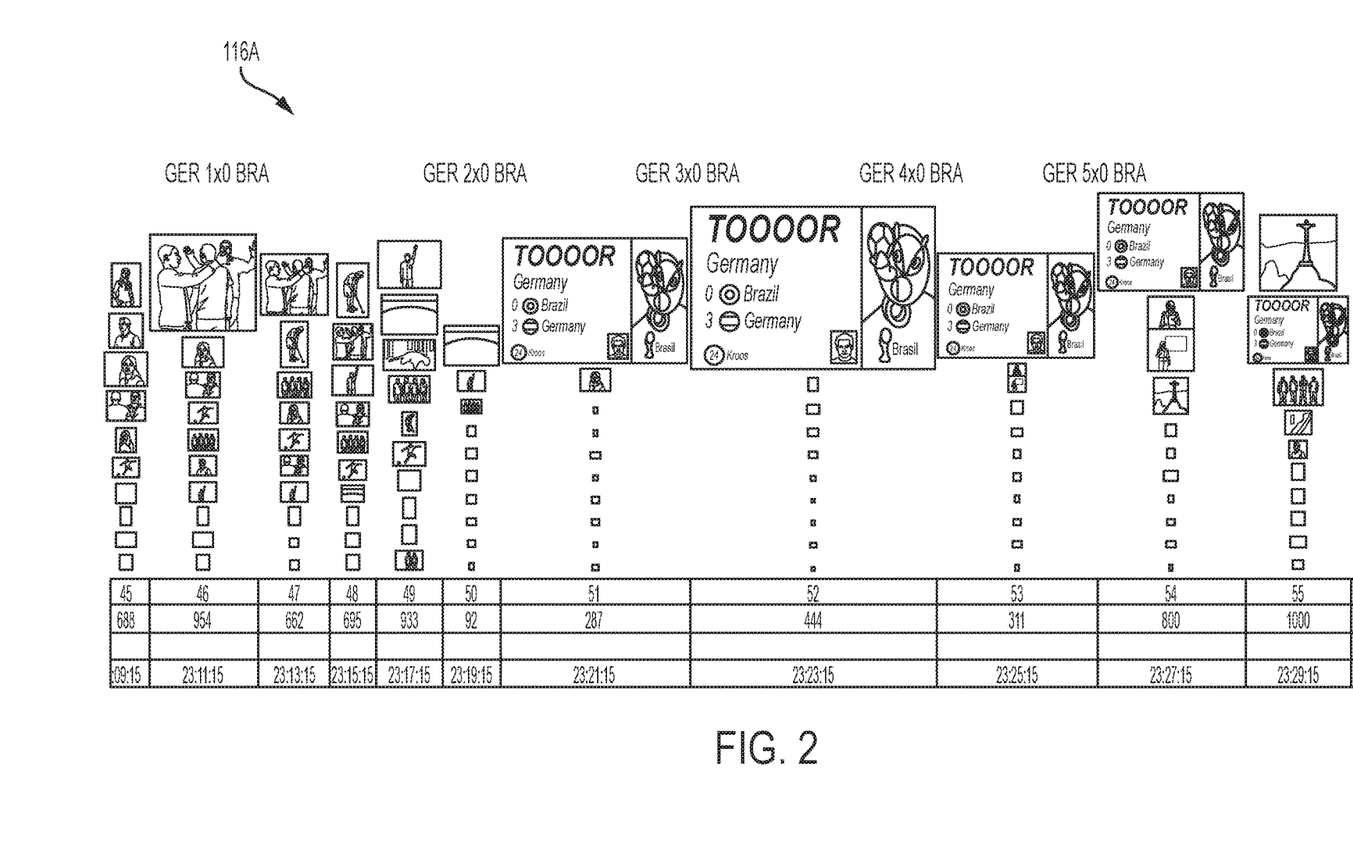
FIG. 2 depicts an example of a time frame grouping according to one or more embodiments.
Figure 3:
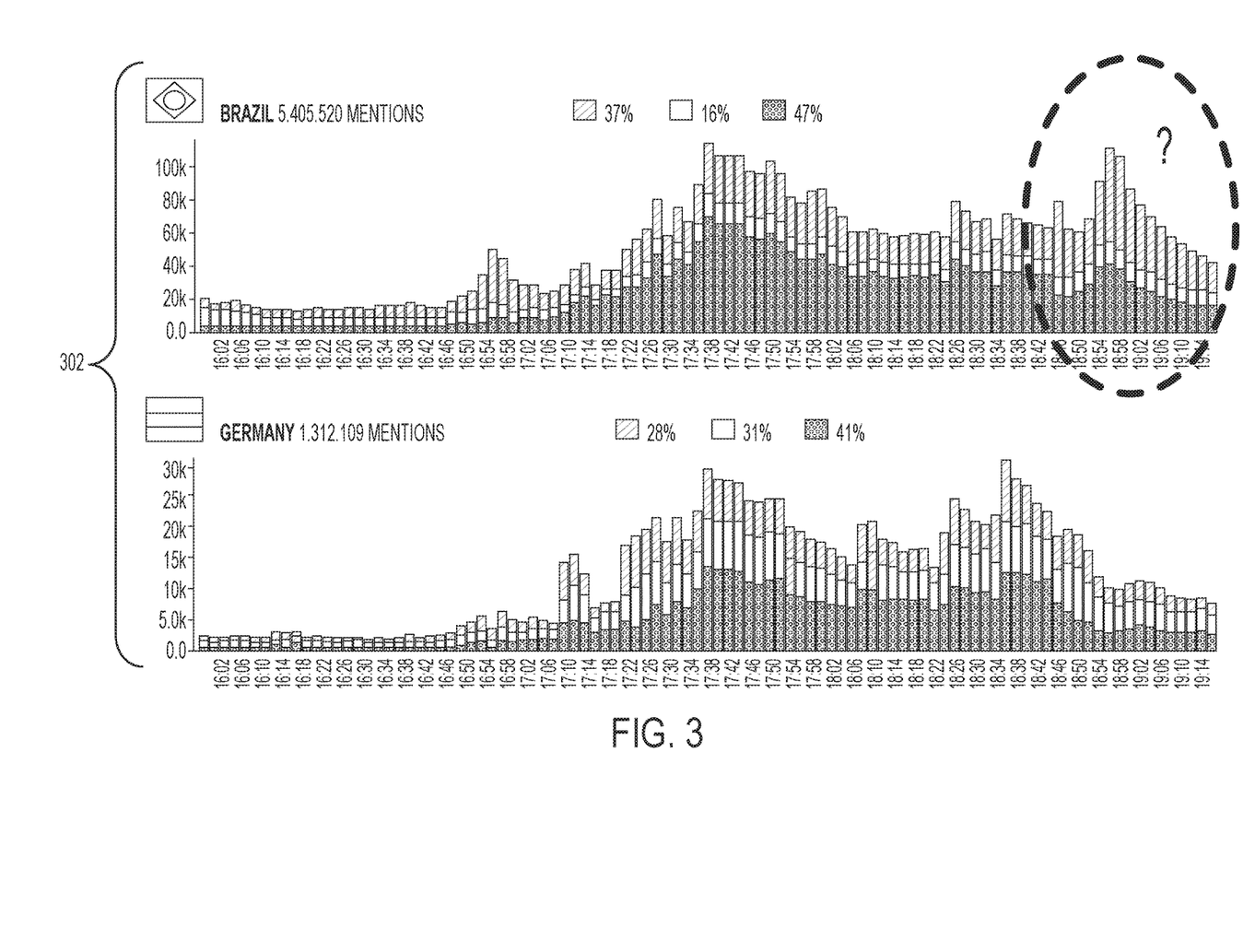
FIG. 3 depicts an example of a time frame grouping and a sentiment analysis according to one or more embodiments.
Figure 4A:
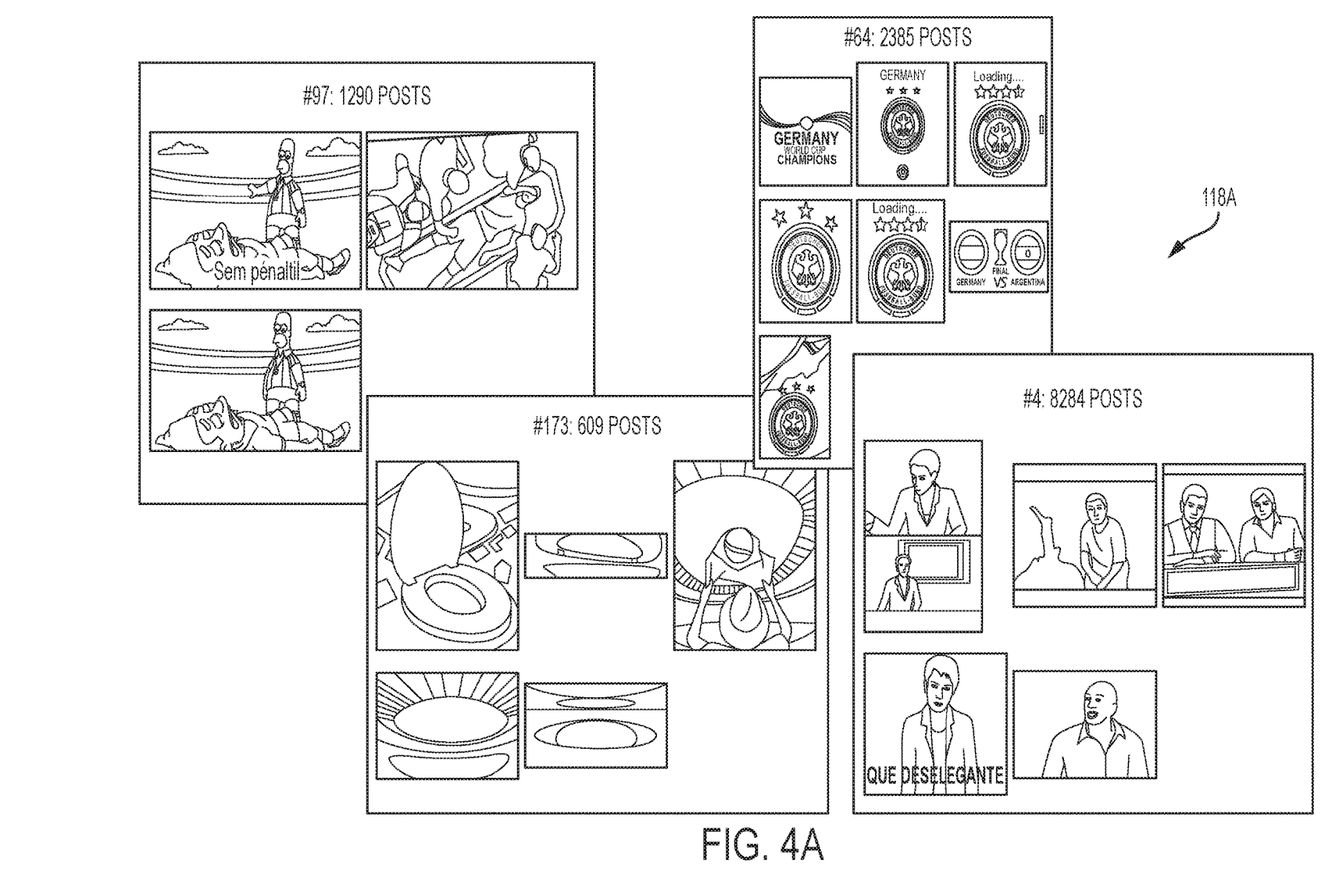
FIG. 4A depicts an example of a clustered view according to one or more embodiments.
Figure 4B:
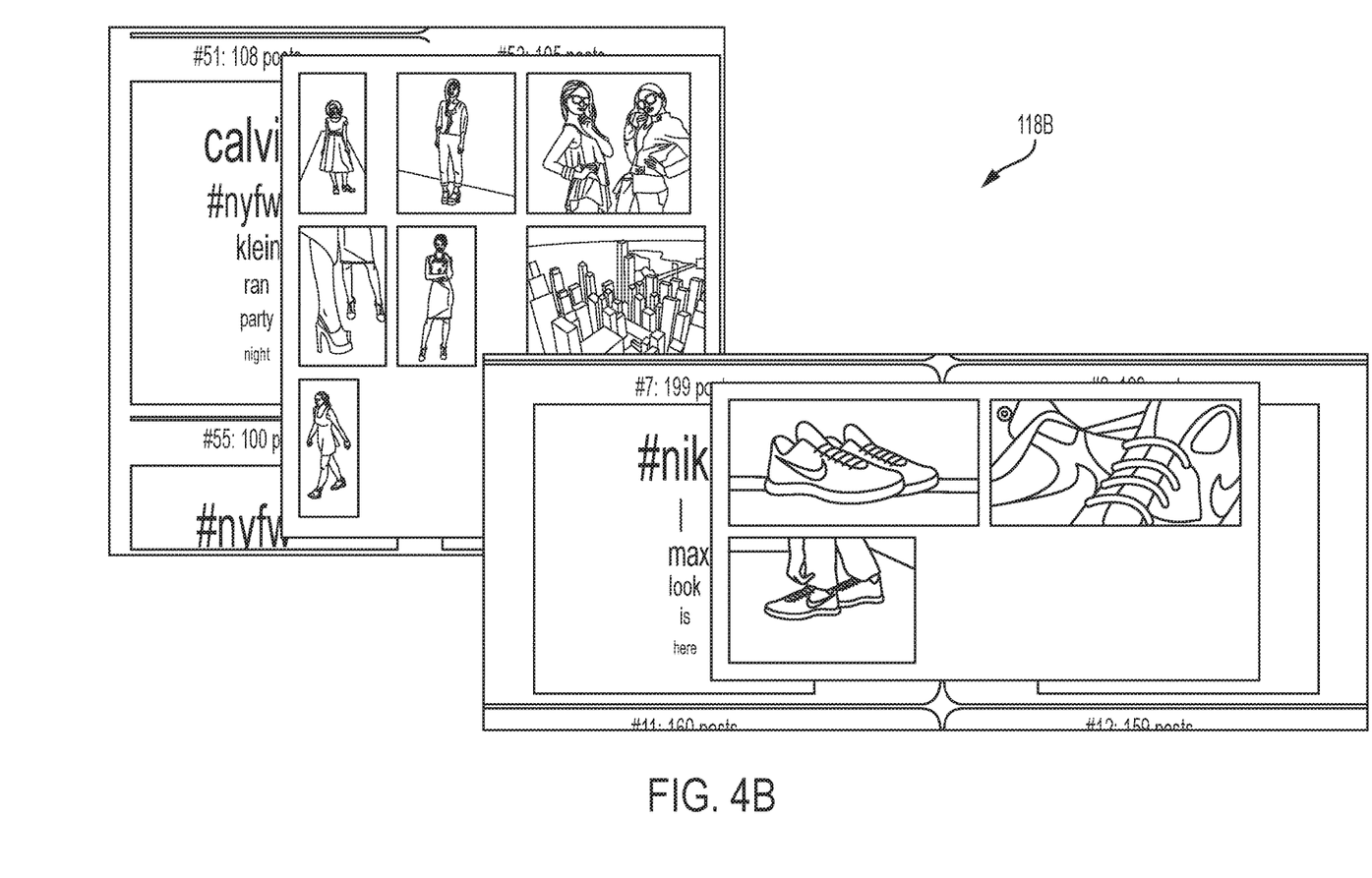
FIG. 4B depicts another example of a clustered view according to one or more embodiments.

Non-limiting examples of time frame grouping 116 are shown at 116A in FIG. 2 and at 116B in FIG. 3. Non-limiting examples of clustering display 118 are shown at 118A in FIG. 4A and at 118B in FIG. 4B. It is noted that the images shown in FIGS. 2, 3, 4A and 4B can be arranged in a variety of ways. For example, as shown in FIG. 3, information from different dimensions such as a sentiment graphs 302 associated with the image(s) can be provided, and the stacks can be arranged in a way to visually reproduce the sentiment dimension. In this case, there could be one stack for each sentiment. FIG. 3 provides an example, wherein the time line corresponds to a World Cup soccer match between Brazil and Germany in which Germany defeated Brazil 7 to 1. Sentiment analysis 302 shows negative social media sentiments in Brazil early in the timeline, and then shows an unexplained spike in positive sentiment in Brazil later in the timeline. Time frame grouping 116B shows that the analysis of image postings according to the present disclosure reveals that during the later portion of the timeline, a very emotional and uplifting message was delivered to Brazilian soccer fans in a post-game interview given by Brazilian soccer player David Luiz. Time frame grouping 116B provides an immediate and easily visualized explanation for the spike in positive sentiment shown in sentiment analysis 302.

Figure 5:
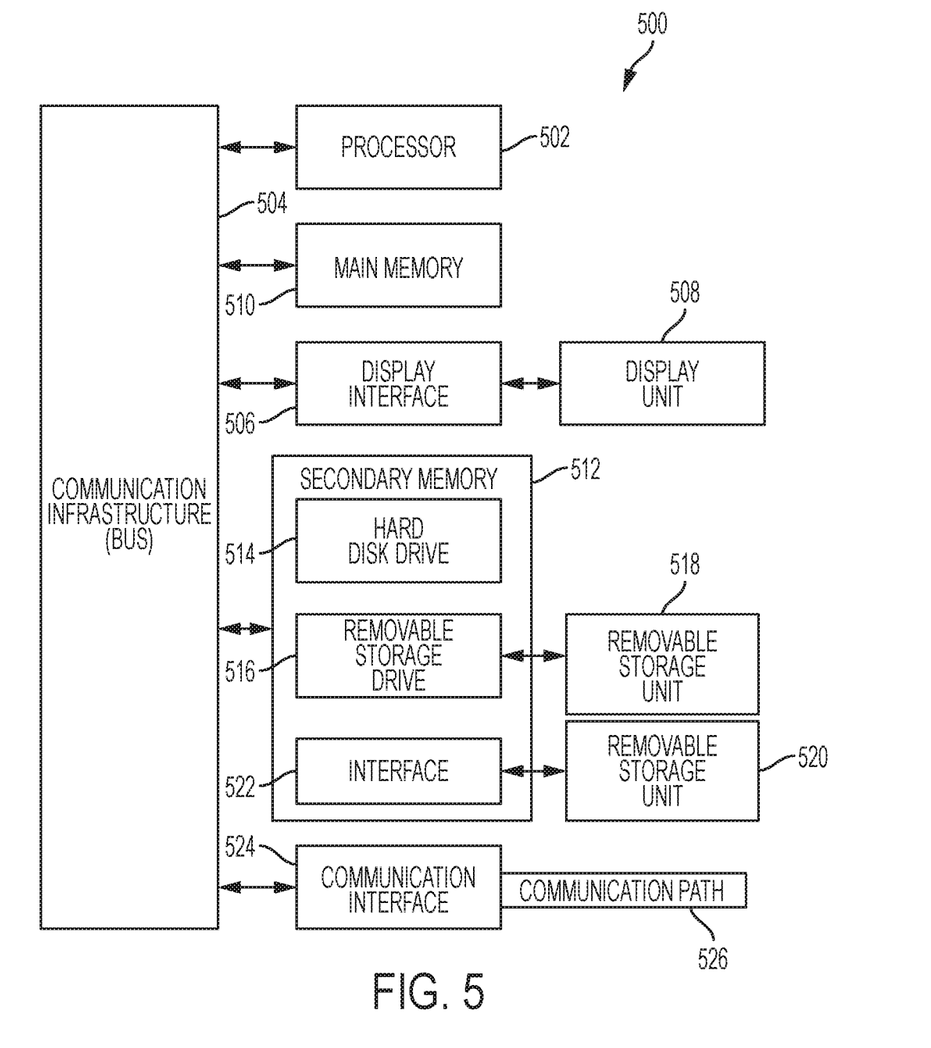
FIG. 5 depicts a computer system capable of implementing hardware components of one or more embodiments.

FIG. 5 depicts a high level block diagram computer system 500, which may be used to implement one or more embodiments of the present disclosure. More specifically, computer system 500 may be used to implement hardware components of image analysis system 100 shown in FIG. 1. Although one exemplary computer system 500 is shown, computer system 500 includes a communication path 526, which connects computer system 500 to additional systems (not depicted) and may include one or more wide area networks (WANs) and/or local area networks (LANs) such as the Internet, intranet(s), and/or wireless communication network(s). Computer system 500 and additional system are in communication via communication path 526, e.g., to communicate data between them.

Computer system 500 includes one or more processors, such as processor 502. Processor 502 is connected to a communication infrastructure 504 (e.g., a communications bus, cross-over bar, or network). Computer system 500 can include a display interface 506 that forwards graphics, textual content, and other data from communication infrastructure 504 (or from a frame buffer not shown) for display on a display unit 508. Computer system 500 also includes a main memory 510, preferably random access memory (RAM), and may also include a secondary memory 512. Secondary memory 512 may include, for example, a hard disk drive 514 and/or a removable storage drive 516, representing, for example, a floppy disk drive, a magnetic tape drive, or an optical disk drive. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disk, etc. which is read by and written to by removable storage drive 516. As will be appreciated, removable storage unit 518 includes a computer readable medium having stored therein computer software and/or data.

In alternative embodiments, secondary memory 512 may include other similar means for allowing computer programs or other instructions to be loaded into the computer system. Such means may include, for example, a removable storage unit 520 and an interface 522. Examples of such means may include a program package and package interface (such as that found in video game devices), a removable memory chip (such as an EPROM, or PROM) and associated socket, and other removable storage units 520 and interfaces 522 which allow software and data to be transferred from the removable storage unit 520 to computer system 500.

Computer system 500 may also include a communications interface 524. Communications interface 524 allows software and data to be transferred between the computer system and external devices. Examples of communications interface 524 may include a modem, a network interface (such as an Ethernet card), a communications port, or a PCM-CIA slot and card, etcetera. Software and data transferred via communications interface 524 are in the form of signals which may be, for example, electronic, electromagnetic, optical, or other signals capable of being received by communications interface 524. These signals are provided to communications interface 524 via communication path (i.e., channel) 526. Communication path 526 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 510 and secondary memory 512, removable storage drive 516, and a hard disk installed in hard disk drive 514. Computer programs (also called computer control logic) are stored in main memory 510 and/or secondary memory 512. Computer programs may also be received via communications interface 524. Such computer programs, when run, enable the computer system to perform the features of the present disclosure as discussed herein. In particular, the computer programs, when run, enable processor 502 to perform the features of the computer system. Accordingly, such computer programs represent controllers of the computer system.

Thus it can be seen from the forgoing detailed description that one or more embodiments of the present disclosure provide technical benefits and advantages. The present disclosure focuses on the real-time processing and analysis of event-related image posts on social media. By computing the most posted images and grouping them in accordance to their similarity, these images can be organized in a visual interface to provide the users an image-driven social media topic detection system. The groups of images with the highest frequency represent the most prominent topics. By keeping track of the temporal occurrence of the images, it is possible to visualize the temporal evolution of the topics. The present disclosure may be beneficially used in a variety of applications, including for example tracking the posting of certain images such as a trademark or a logo during a certain time frame associated with a particular event.

Figure 6:
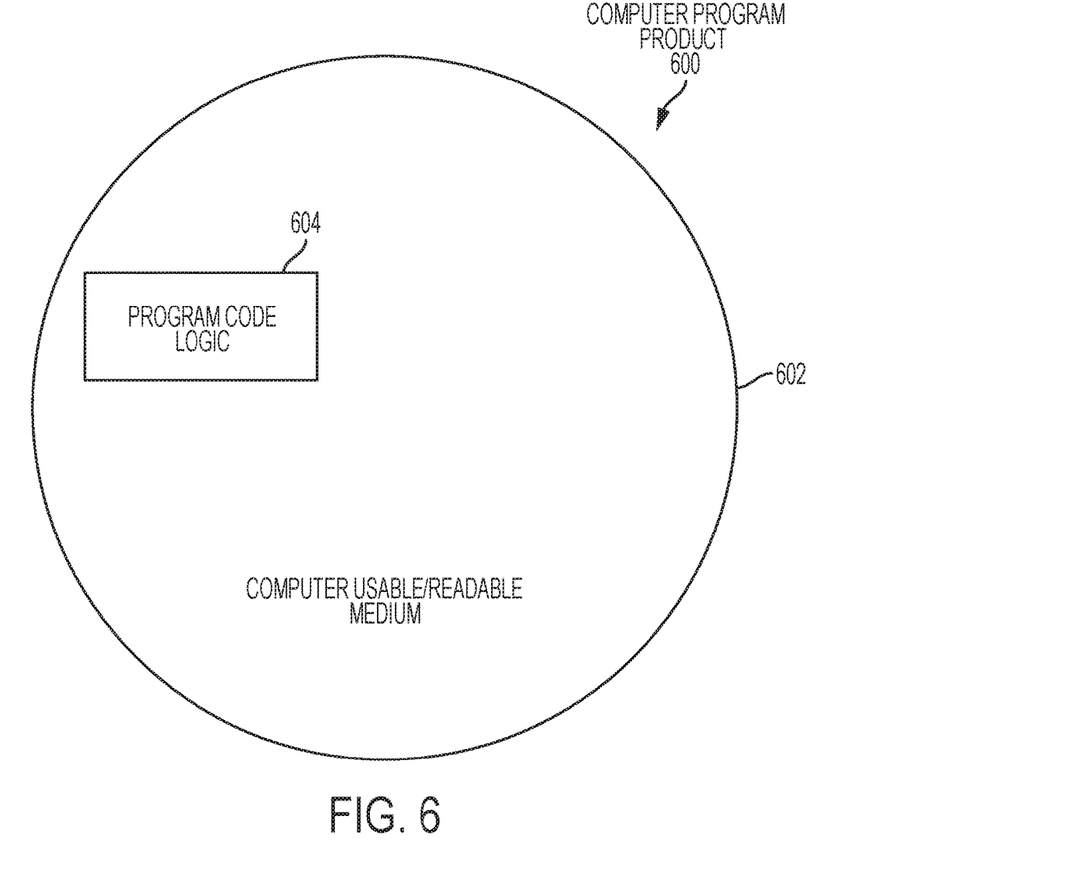
FIG. 6 depicts a diagram of a computer program product according to one or more embodiments.

Referring now to FIG. 6, a computer program product 600 in accordance with an embodiment that includes a computer readable storage medium 602 and program instructions 604 is generally shown.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method of analyzing image data, the method comprising:
    receiving, using a processor system, image data of one or more images that have been posted to internet websites;
    analyzing, using the processor system, the image data to extract image feature data for each one of the one or more images;
    analyzing, using the processor system, the image data to extract metadata of the one or more images;
    creating multiple image files;
    wherein each one of the multiple image files comprises individual ones of the one or more images linked together based on overlaps between the image feature data of the individual ones of the one or more images;
    wherein each one of the multiple image files further comprises individual ones of the one or more images linked together based on overlaps between the metadata of the individual ones of the one or more images;
    indexing the multiple image files to form multiple indexed image files;
    wherein the indexing is based on the image feature data of the individual ones of the one or more images in an individual indexed image file;
    wherein the indexing is further based on the metadata of the individual ones of the one or more images in the individual indexed image file; and
    storing the multiple indexed image files in a memory of the processor system having a searchable indexed data storage structure.

2. The computer implemented method of claim 1 further comprising;
    applying the multiple indexed image files to a clustering algorithm to generate clustered results; and
    displaying the clustered results on a display of the processor system.

3. The computer implemented method of claim 1, wherein:
    the metadata comprises multiple discrete time frames; and
    the computer implemented method further comprises:
    searching the searchable indexed data storage structure of the memory to access the multiple indexed image files based on a predetermined subject matter and the multiple discrete time frames; and
    displaying results of the searching on a display of the processor system.

4. The computer implemented method of claim 3 further comprising:
    accessing sentiment data based on textual sentiment posted on internet web sites;
    wherein the textual sentiment corresponds to the predetermined subject matter and the multiple discrete time frames; and
    displaying the sentiment data with the results of the searching.

5. The computer implemented method of claim 1, wherein:
    the processor system includes a machine learning processor;
    the analyzing of the image data to extract image features data for each one of the one or more images is performed using the machine learning processor; and
    the analyzing of the image data to extract metadata of the one or more images is performed using the machine learning processor.

6. The computer implemented method of claim 5 wherein the image features data comprises image feature vectors.

7. The computer implemented method of claim 5 wherein the metadata comprises metadata vectors.

8. A computer system for analyzing image data, the system comprising:
    a memory; and
    a processor system communicatively coupled to the memory;
    the processor system configured to perform a method comprising:
    receiving image data of one or more images that have been posted to internet websites;
    analyzing the image data to extract image feature data for each one of the one or more images;
    analyzing the image data to extract metadata of the one or more images;
    creating multiple image files;
    wherein each one of the multiple image files comprises individual ones of the one or more images linked together based on overlaps between the image feature data of the individual ones of the one or more images;
    wherein each one of the multiple image files further comprises individual ones of the one or more images linked together based on overlaps between the metadata of the individual ones of the one or more images;
    indexing the multiple image files to form multiple indexed image files;
    wherein the indexing is based on the image feature data of the individual ones of the one or more images in an individual indexed image file;
    wherein the indexing is further based on the metadata of the individual ones of the one or more images in the individual indexed image file; and
    storing the multiple indexed image files in the memory, wherein the memory includes a searchable indexed data storage structure.

9. The computer system of claim 8 further comprising;
    applying the multiple indexed image files to a clustering algorithm to generate clustered results; and
    displaying the clustered results on a display of the processor system.

10. The computer system of claim 8, wherein:
    the metadata comprises multiple discrete time frames; and
    the method performed by the processor system further comprises:
    searching the searchable indexed data storage structure of the memory to access the multiple indexed image files based on a predetermined subject matter and the multiple discrete time frames; and
    displaying results of the searching on a display of the processor system.

11. The computer system of claim 10 further comprising:
    accessing sentiment data based on textual sentiment posted on internet web sites;

wherein the textual sentiment corresponds to the predetermined subject matter and the multiple discrete time frames; and displaying the sentiment data with the results of the searching.

12. The computer system of claim 8, wherein:

the processor system includes a machine learning processor;

the analyzing of the image data to extract image features data for each one of the one or more images is performed using the machine learning processor;

the analyzing of the image data to extract metadata of the one or more images is performed using the machine learning processor.

13. The computer system of claim 12 wherein the image features data comprises image feature vectors.

14. The computer system of claim 12 wherein the metadata comprises metadata vectors.

15. A computer program product for analyzing image data, the computer program product comprising:

a computer readable storage medium having program instructions embodied therewith, wherein the computer readable storage medium is not a transitory signal per se, the program instructions readable by a processor system to cause the processor system to perform a method comprising:

receiving, using the processor system, image data of one or more images that have been posted to internet websites;

analyzing, using the processor system, the image data to extract image features data for each one of the one or more images;

analyzing, using the processor system, the image data to extract metadata of the one or more images;

creating multiple image files;

wherein each one of the multiple image files comprises individual ones of the one or more images linked together based on overlaps between the image feature data of the individual ones of the one or more images;

wherein each one of the multiple image files further comprises individual ones of the one or more images linked together based on overlaps between the metadata of the individual ones of the one or more images;

indexing the multiple image files to form multiple indexed image files;

wherein the indexing is based on the image feature data of the individual ones of the one or more images in an individual indexed image file;

wherein the indexing is further based on the metadata of the individual ones of the one or more images in the individual indexed image file; and storing the multiple indexed image files in a memory of the processor system having a searchable indexed data storage structure.

16. The computer program product of claim 15 further comprising;

applying the multiple indexed image files to a clustering algorithm to generate clustered results; and displaying the clustered results on a display of the processor system.

17. The computer program product of claim 15, wherein:

the metadata comprises multiple discrete time frames; and the method performed by the processor system further comprises:

searching the searchable indexed data storage structure of the memory to access the multiple indexed image files based on a predetermined subject matter and the multiple discrete time frames; and displaying results of the searching on a display of the processor system.

18. The computer program product of claim 17 further comprising:

accessing sentiment data based on textual sentiment posted on internet web sites;

wherein the textual sentiment corresponds to the predetermined subject matter and the multiple discrete time frames; and displaying the sentiment data with the results of the searching.

19. The computer program product of claim 15, wherein:

the processor system includes a machine learning processor;

the analyzing of the image data to extract image features data for each one of the one or more images is performed using the machine learning processor;

the analyzing of the image data to extract metadata of the one or more images is performed using the machine learning processor.

20. The computer program product of claim 15 wherein:

the image features data comprises image feature vectors; and the metadata comprises metadata vectors.

* * * * *